(12) United States Patent
Short et al.

(10) Patent No.: US 7,716,731 B2
(45) Date of Patent: May 11, 2010

(54) METHOD FOR DYNAMICALLY TUNNELING OVER AN UNRELIABLE PROTOCOL OR A RELIABLE PROTOCOL, BASED ON NETWORK CONDITIONS

(75) Inventors: Todd M. Short, Sudbury, MA (US); Heng-Chun Chen, Nashua, NH (US); Vincent E. Parla, North Hampton, NH (US); Marc R. Tardif, Franklin, MA (US)

(73) Assignee: Cisco Technology, Inc., San Jose, CA (US)

( * ) Notice: Subject to any disclaimer, the term of this patent is extended or adjusted under 35 U.S.C. 154(b) by 1055 days.

(21) Appl. No.: 11/256,874

(22) Filed: Oct. 24, 2005

(65) Prior Publication Data
US 2007/0094723 A1 Apr. 26, 2007

(51) Int. Cl.
*G06F 9/00* (2006.01)
*G06F 15/16* (2006.01)
*G06F 17/00* (2006.01)

(52) U.S. Cl. ...................................................... 726/14
(58) Field of Classification Search .................... 726/14
See application file for complete search history.

(56) References Cited

U.S. PATENT DOCUMENTS

| | | | |
|---|---|---|---|
| 6,438,603 B1 | 8/2002 | Ogus | 709/233 |
| 6,543,005 B1* | 4/2003 | Bamford | 714/18 |
| 6,898,729 B2 | 5/2005 | Virolainen et al. | 714/4 |
| 7,072,309 B2 | 7/2006 | Xie et al. | 370/278 |
| 2004/0221004 A1* | 11/2004 | Chalfin et al. | 709/203 |
| 2006/0206705 A1* | 9/2006 | Khosravi | 713/151 |

OTHER PUBLICATIONS

Rescorla, E. et al., "Datagram Transport Layer Security," RTFM, Inc., Stanford University, Jun. 2004, 27 pages, http://tools.ietf.org/html/draft-rescorla-dtls-05.

* cited by examiner

*Primary Examiner*—Kambiz Zand
*Assistant Examiner*—Stephen Sanders
(74) *Attorney, Agent, or Firm*—BainwoodHuang

(57) ABSTRACT

A method, and computer program product for providing dynamically tunneling over an unreliable protocol or a reliable protocol based on network conditions is presented. A connection between a source device and a destination device is established using a reliable protocol. An attempt is then made to utilize an unreliable protocol to communicate between the source device and the destination device. When the attempt to utilize an unreliable protocol is successful, then the unreliable protocol is used to transmit data between the source device and the destination device. When the attempt to utilize the unreliable protocol is unsuccessful, then the reliable protocol connection is used to transmit data between the source device and the destination device.

22 Claims, 4 Drawing Sheets

METHOD FOR DYNAMICALLY TUNNELING OVER AN UNRELIABLE PROTOCOL OR A RELIABLE PROTOCOL, BASED ON NETWORK CONDITIONS

BACKGROUND

Transmission Control Protocol (TCP) is one of the main protocols in TCP/IP (Internet protocol) networks. TCP enables two hosts to establish a connection and exchange streams of data. TCP guarantees delivery of data and also guarantees that packets will be delivered in the same order in which they were sent. TCP is referred to as a "reliable" protocol.

Secure Sockets Layer (SSL) is a protocol that supplies secure data communication through data encryption and decryption. SSL enables communications privacy over networks. SSL tunneling refers to the ability of a server to allow a client to establish a tunnel through the server directly to the Web server with the requested HTTPS object. Whenever a client browser requests an HTTPS object through the Server, SSL tunneling is used. SSL tunneling, since it requires a reliable connection, occurs over TCP.

Transport Layer Security (TLS) is the IETF standard version of SSLv3 with security improvements and corrections. TLS is a protocol that guarantees privacy and data integrity between client/server applications communicating over the Internet. The TLS protocol is made up of two layers: the TLS Record Protocol and the TLS handshake protocol.

The TLS record protocol is layered on top of a reliable transport protocol, such as TCP. The TLS record protocol ensures that the connection is private by using symmetric data encryption and it ensures that the connection is reliable. The TLS record protocol also is used for encapsulation of higher-level protocols, such as the TLS handshake protocol.

The TLS handshake protocol allows authentication between the server and client and the negotiation of an encryption algorithm and cryptographic keys before the application protocol transmits or receives any data.

User Datagram Protocol (UDP) is a connectionless protocol that, like TCP, runs on top of IP networks. Unlike TCP/IP, UDP/IP provides very few error recovery services, offering instead a direct way to send and receive datagrams over an IP network. UDP is therefore referred to as an "unreliable" protocol. UDP is used primarily for broadcasting messages over a network.

Datagram TLS (DTLS) is a protocol based on TLS that is capable of securing datagram transport (UDP for instance). DTLS is well suited for securing applications that are delay sensitive (and hence use datagram transport), tunneling applications (Virtual Private Networks or VPNs), and applications that tend to run out of file descriptors or socket buffers.

HyperText Transfer Protocol (HTTP) is the underlying protocol used by the World Wide Web. HTTP defines how messages are formatted and transmitted, and what actions Web servers and browsers should take in response to various commands. For example, when a user enters a URL in a browser, this sends an HTTP command to the Web server directing the web server to fetch and transmit the requested Web page.

Secure HTTP (HTTPS) is an extension to HTTP that supports various encryption and authentication measures to keep all transactions secure from end to end. HTTPS can comprise HTTP over TLS or TCP.

Virtual Private Network (VPN) is a network that is constructed using public systems such as the Internet but uses security mechanisms to ensure privacy and that only authorized users are allowed access.

SSL VPNs permit access to corporate resources securely. One of the advantages of SSL VPNs is the ability to connect from almost anywhere, including through firewalls and proxies. This is because SSL VPNs use the same protocols that are used for World Wide Web (WWW) access, and are able to use that infrastructure (e.g., proxies and firewalls) to its advantage.

Voice over Internet Protocol (VOIP) is a technology that allows persons to send and receive voice, fax and data information over a combination of a phone network and a digital communications network. In a VOIP environment voice signals are processed for transport over a packet network. The VOIP environment includes a pair of gateways, one at each end of the packet network. The gateways perform the compression and packetizing necessary to accomplish VOIP. The voice signal is received by a first gateway, where the voice signal is then compressed and packetized. The packets are sent out on the packet network. The packets are received by the second gateway from the packet network. The second gateway converts the packets back into a voice signal.

Traditionally systems which are used for providing VOIP functions, video, file transfers, real-time and non-real time data transfer typically use a single protocol. A system may use SSL over TCP to connect between a source and destination device and to transmit data between the devices. Other conventional systems providing the same functions may use DTLS over UDP.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
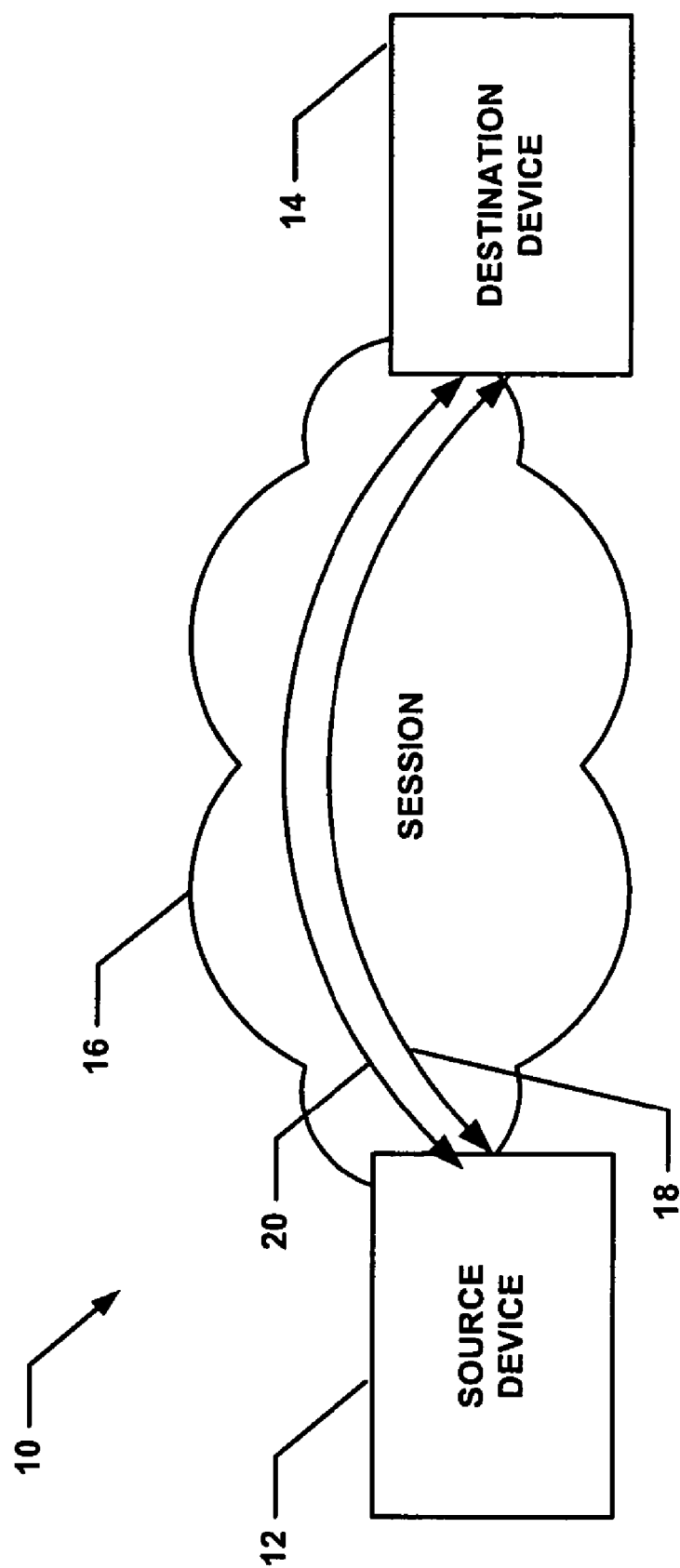
FIG. 1 illustrates a block diagram of a particular embodiment of an environment that provides a method for dynamically tunneling over an unreliable protocol or a reliable protocol based on network conditions in accordance with embodiments of the invention.

Conventional mechanisms such as those explained above suffer from a variety of shortcomings. Conventional tunneling of IP datagrams over TCP has disadvantages, especially when packet loss occurs. The multiple TCP layers end up retransmitting, causing additional network latency and congestion. In particular, when TCP is used as part of a VOIP network, the retransmissions can cause an echo effect in the call (known as reverberation), which affects the clarity and quality of the VOIP call. UDP-based streaming protocols, such as VOIP, are not designed to handle delays that may be caused by TCP retransmission. The negotiation that takes place between the source device and the destination device may be cumbersome and time-consuming when DTLS is used.

Embodiments of the invention significantly overcome such deficiencies and provide mechanisms and techniques that provide a method for dynamic tunneling over UDP or TCP based on network conditions.

In a particular embodiment of a method for providing dynamic tunneling over an unreliable protocol or a reliable protocol based on network conditions, the method begins by establishing a connection between a source device and a destination device using a reliable protocol. An attempt is then made to utilize an unreliable protocol to communicate between the source device and the destination device. When the attempt to utilize the unreliable protocol is successful, then the unreliable protocol is used to transmit data between the source device and the destination device. Thus two different protocols (TCP and UDP) between the source device and the destination device are used simultaneously. When the attempt to utilize the unreliable protocol is unsuccessful, then the reliable protocol connection is used to transmit data between the source device and the destination device.

Other embodiments include a computer readable medium having computer readable code thereon for providing dynamic tunneling over an unreliable protocol or a reliable protocol based on network conditions. The computer readable medium includes instructions for establishing a connection between a source device and a destination device using a reliable protocol. The medium further includes instructions for attempting to utilize an unreliable protocol to communicate between the source device and the destination device and when the attempt to utilize the unreliable protocol is successful, then using the unreliable protocol to transmit data between the source device and the destination device; and when the attempt to utilize the unreliable protocol is unsuccessful, then using the reliable protocol connection to transmit data between the source device and the destination device.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method for dynamically tunneling over an unreliable protocol or a reliable protocol based on network conditions as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method for dynamically tunneling over an unreliable protocol or a reliable protocol based on network conditions as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

Referring to FIG. 1, an example environment 10 for providing dynamically tunneling over an unreliable protocol or a reliable protocol based on network conditions is shown. The environment 10 includes a source device 12 which is in communication with a destination device 14 by way of a session 16. The session includes a tunnel 18 established using a reliable protocol, and further includes a second tunnel 20 established using an unreliable protocol.

In operation, the reliable protocol tunnel 18 is established between the source device and the destination device. The establishing of the tunnel provides several functions. Besides establishing a control channel, this also establishes a master-secret and a session-id. This reliable protocol tunnel may be provided using SSL over TCP or TLS. The resulting tunnel can be used to transmit data.

An attempt is then made to utilize an unreliable protocol to communicate between the source device 12 and said destination device 14. This may be done by establishing a connection 20 using DTLS over UDP using a resumed handshake. The use of the resumed handshake to establish the unreliable protocol tunnel may further include using the master-secret established by the connection using a reliable protocol and also using the session-id established by said reliable protocol connection. The session-id may also be used for identifying the master-secret. A resumed handshake is much simpler and less time consuming than attempting to negotiate a full handshake, since the resumed handshake uses the master-secret and session-id previously negotiated by the reliable protocol. The session-id may further be used for associating the reliable protocol connection with the unreliable protocol connection.

The session-id may also be used as a security cookie. If the session-id is not found, then the packet is dropped. In this manner the session-id is used to prevent malicious attackers from creating tunnels.

When the attempt to utilize the unreliable protocol connection is successful, then the unreliable protocol connection 20 is used to transmit data between the source device 12 and the destination device 14. By using the unreliable protocol to transmit packets, there are no retransmissions of packets, and situations where retransmissions are problematic, such as VOIP reverberation, are avoided. Additionally, the lack of retransmissions provides more effective use of the available bandwidth between the source and destination devices.

When the attempt to utilize the unreliable protocol connection 20 is unsuccessful, then the reliable protocol connection 18 is used to transmit data between the source device 12 and said destination device 14.

By way of the above-describe embodiment, simultaneous use of two different protocols between the same devices is accomplished and used to establish connections and to transmit data. For example, SSL is used to establish a secure connection while DTLS is used to transmit data.

Figure 2A:
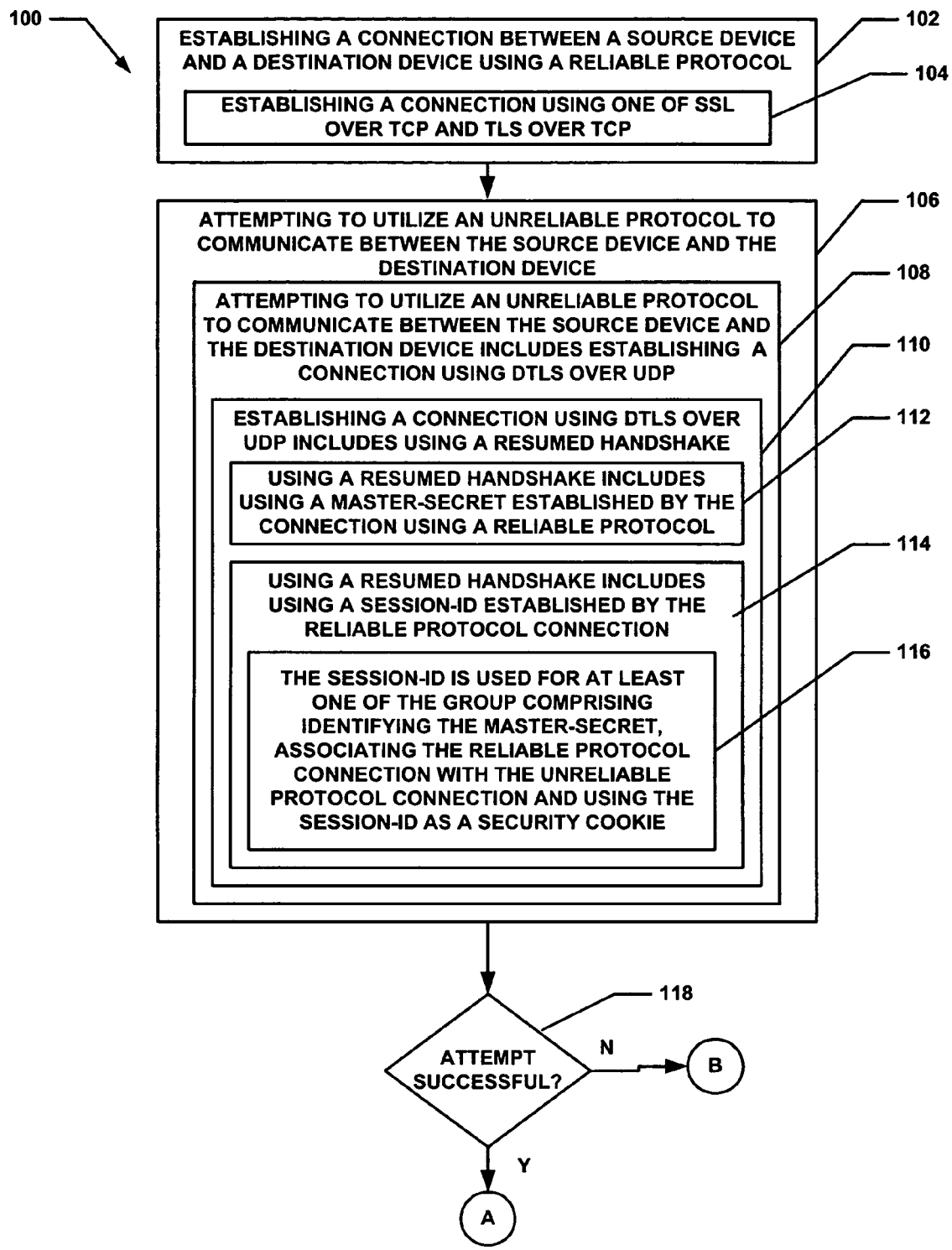
FIG. 2A is a first part of a flow diagram for a particular embodiment of a method for dynamically tunneling over an unreliable protocol or a reliable protocol based on network conditions in accordance with embodiments of the invention.
Figure 2B:
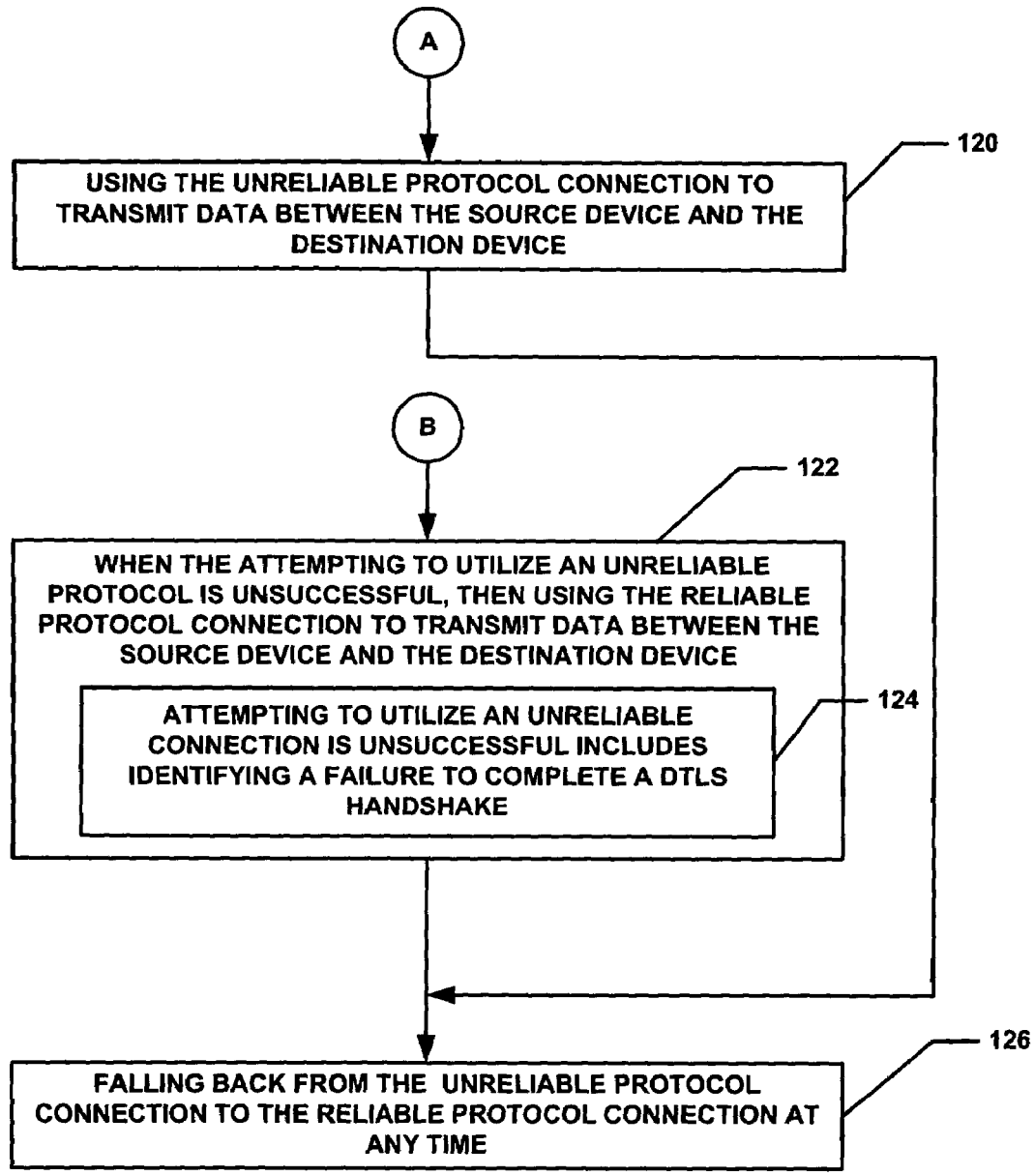
FIG. 2B is a second part of the flow diagram of FIG. 2A.

A flow chart of a particular embodiment of the presently disclosed method is depicted in FIGS. 2A and 2B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of dynamically tunneling over an unreliable protocol or a reliable protocol based on network conditions is shown. The method 100 begins with processing block 102 wherein a connection between a source device and a destination device using a reliable protocol is established. In processing block 104, the reliable protocol connection may be established using a reliable protocol such as by using SSL over TCP or TLS over TCP.

As recited in processing block 106, an attempt is made to utilize an unreliable protocol to communicate between the source device and the destination device. In processing block 108, the attempt to utilize an unreliable protocol to communicate between the source device and the destination device includes establishing a connection using DTLS over UDP. Processing block 110 discloses that the establishing a connection using DTLS over UDP includes using a resumed handshake. In processing block 112, the using a resumed handshake includes using a master-secret established by the connection using the reliable protocol. As stated in processing block 114, the using a resumed handshake includes using a session-id established by the reliable protocol connection. In processing block 116, the session-id is used for at least one of the group comprising identifying the master-secret, associating the reliable protocol connection with the unreliable protocol connection and using the session-id as a security cookie. If the session-id is not found, then the packet is dropped. In this manner the session-id is used to prevent malicious attackers from creating tunnels.

In decision block 118, a determination is made whether the attempt to utilize the unreliable protocol to communicate between the source device and the destination device is successful. When the attempt to utilize the unreliable protocol to communicate between the source device and the destination device is successful, processing continues at processing block 120. When the attempt to utilize the unreliable protocol to communicate between the source device and the destination device is unsuccessful, then processing continues at processing block 122.

In processing block 120, when the attempt to utilize the unreliable protocol to communicate between the source device and the destination device is successful, then the unreliable protocol connection is used to transmit data between said source device and said destination device. When using the unreliable protocol connection to transmit packets, there are no retransmissions of packets, and situations where retransmissions are problematic, such as VOIP reverberation, are avoided. Additionally, the lack of retransmissions provides more effective use of the available bandwidth between the source and destination devices.

In processing block 122, when the attempt to utilize the unreliable protocol connection is unsuccessful, then the reliable protocol connection is used to transmit data between the source device and the destination device. As recited in processing block 124, the unsuccessful attempt to utilize the unreliable protocol connection may include the failure to complete a DTLS handshake.

At processing block 126, the system may fall back from using the unreliable protocol connection for transmitting data to using the reliable protocol connection to transmit data at any time. The above described method thus allows the use of two different protocols (a reliable protocol and an unreliable protocol) simultaneously, depending on network conditions such that optimal performance is achieved.

Another embodiment involves a computer readable medium having computer readable code thereon for providing dynamically tunneling over an unreliable protocol or a reliable protocol based on network conditions. The medium, in a particular embodiment, includes instructions for establishing a connection between a source device and a destination device using a reliable protocol. The medium may include additional instructions wherein the reliable protocol connection may be established using a reliable protocol such as by using one of SSL over TCP and TLS over TCP.

The medium further includes instructions for attempting to utilize an unreliable protocol to communicate between the source device and the destination device. The instructions for attempting to utilize an unreliable protocol to communicate between the source device and the destination device includes instructions for establishing a connection using DTLS over UDP. The medium may further include instructions for establishing a connection using DTLS over UDP includes using a resumed handshake. The instructions for using a resumed handshake may include instructions for using a master-secret established by the connection using a reliable protocol. Further, the instructions for using a resumed handshake includes instructions for using a session-id established by the reliable protocol connection. The medium additionally includes instructions for using the session-id for at least one of the group comprising identifying the master-secret, associating the reliable protocol connection with the unreliable protocol connection and using the session-id as a security cookie.

The medium also includes instructions for attempting to utilize the unreliable protocol to communicate between the source device and the destination device was successful. When the attempt to utilize the unreliable protocol to communicate between the source device and the destination device is successful, then the unreliable protocol connection is used to transmit data between said source device and said destination device.

The medium further still includes instructions such that, when the attempt to utilize the unreliable protocol connection is unsuccessful, then the reliable protocol connection is used to transmit data between the source device and the destination device. The medium further includes instructions such that the system may fall back from using the unreliable protocol connection to using the reliable protocol connection at any time.

Figure 3:
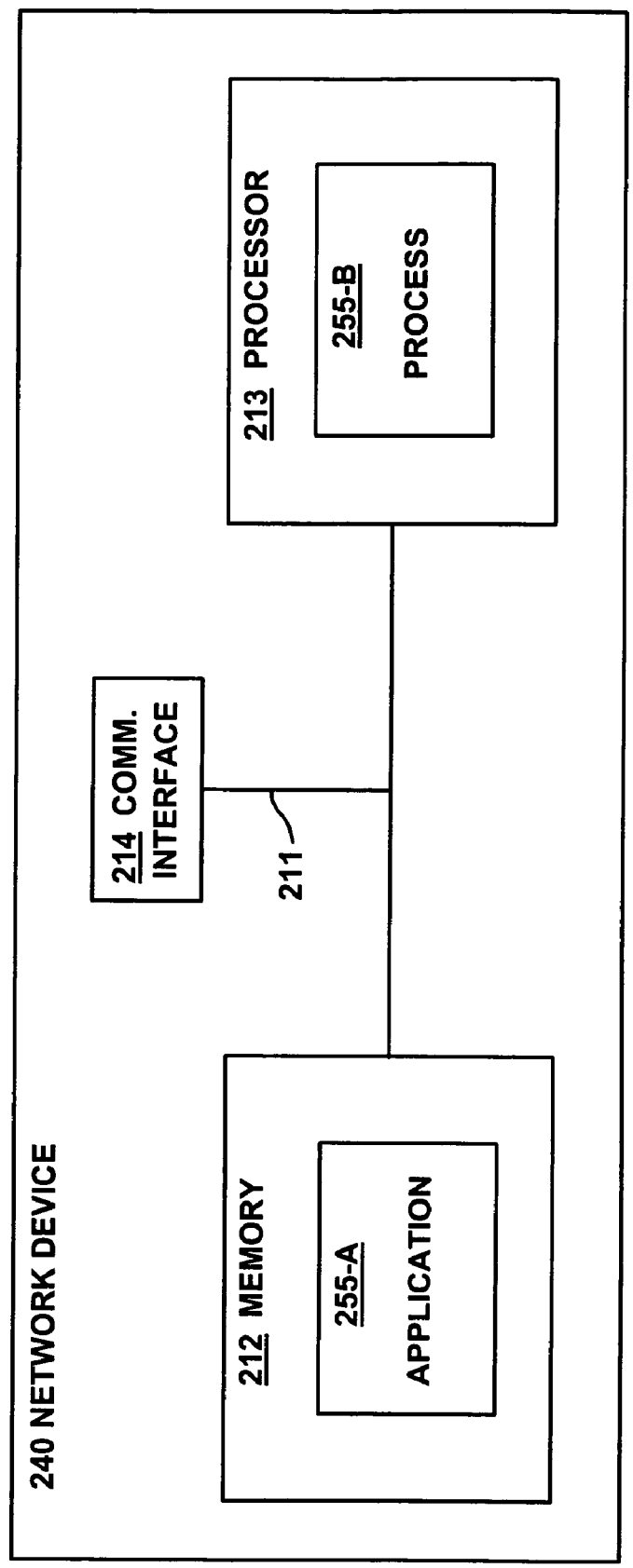
FIG. 3 illustrates an example computer system architecture for a computer system that provides a method for dynamically tunneling over an unreliable protocol or a reliable protocol based on network conditions in accordance with embodiments of the invention.

FIG. 3 illustrates example architectures of a computer system that is configured as a source network device 240. The device 240 may be any type of computerized system such as a personal computer, workstation, portable computing device, mainframe, server or the like. In this example, the device includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

The present method and computer readable medium for providing dynamically tunneling over an unreliable protocol or a reliable protocol based on network conditions provides the ability to use encrypted UDP traffic, quick negotiation of DTLS/UDP cryptographic parameters (master-secret and session-id and use of a resumed handshake). Further, if the DTLS/UDP tunnel cannot be established, the system can fall back to TLS/TCP tunnel. In such a manner UDP over TCP issues (no delay/retransmissions) are resolved, as are TCP over TCP issues (no retransmissions at multiple levels).

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method by which a source device dynamically tunnels over a selected one of an unreliable protocol or a reliable protocol based on network conditions, the method comprising:

establishing a reliable protocol connection to a destination device using a reliable protocol, the reliable protocol connection including a TCP/IP connection in which a TCP transport mechanism runs directly on top of an IP packet delivery mechanism; and attempting to utilize an unreliable protocol connection to communicate between said source device and said destination device, the unreliable protocol connection being distinct from the reliable protocol connection and including a UDP/IP instance in which a UDP transport mechanism runs directly on top of the IP packet delivery mechanism, and when said attempting to utilize said unreliable protocol connection is successful, then using said unreliable protocol connection to transmit data between said source device and said destination device, and when said attempting to utilize said unreliable protocol connection is unsuccessful, then using said reliable protocol connection to transmit data between said source device and said destination device, wherein using said reliable protocol connection to transmit data between said source device and said destination device includes using said TCP/IP connection and not said UDP/IP instance for transmitting said data packets upon the occurrence of the unsuccessful attempt to utilize the unreliable protocol connection.

2. The method of claim 1 wherein said establishing said reliable protocol connection comprises establishing a connection using one of SSL over TCP and TLS over TCP.

3. The method of claim 1 wherein said attempting to utilize said unreliable protocol connection to communicate between said source device and said destination device includes establishing the connection using DTLS over UDP.

4. The method of claim 1 further comprising falling back from said unreliable protocol connection to said reliable protocol connection at any time.

5. The method of claim 3 wherein said establishing the connection using DTLS over UDP includes using a resumed handshake.

6. The method of claim 5 wherein said using said resumed handshake includes using a master-secret established by said reliable protocol connection.

7. The method of claim 6 wherein said using said resumed handshake includes using a session-id established by said reliable protocol connection.

8. The method of claim 7 wherein said session-id is used for at least one of the group comprising identifying said master-secret, associating said reliable protocol connection with said unreliable protocol connection and using said session-id as a security cookie.

9. The method of claim 1 including, when said attempting to utilize said unreliable connection is unsuccessful, identifying a failure to complete a DTLS handshake.

10. A computer readable medium having computer readable code thereon for causing a source device to dynamically tunnel over a selected one of an unreliable protocol or a reliable protocol based on network conditions, the medium including:
  instructions for establishing a reliable protocol connection to a destination device using a reliable protocol, the reliable protocol connection including a TCP/IP connection in which a TCP transport mechanism runs directly on top of an IP packet delivery mechanism; and
  instructions for attempting to utilize an unreliable protocol connection to communicate between said source device and said destination device, the unreliable protocol connection being distinct from the reliable protocol connection and including a UDP/IP instance in which a UDP transport mechanism runs directly on top of the IP packet delivery mechanism, and when said attempting to utilize said unreliable protocol connection is successful, then using said unreliable protocol connection to transmit data between said source device and said destination device; and when said attempting to utilize said unreliable protocol connection is unsuccessful, then using said reliable protocol connection to transmit data between said source device and said destination device, wherein using said reliable protocol connection to transmit data between said source device and said destination device includes using said TCP/IP connection and not said UDP/IP instance for transmitting said data packets upon the occurrence of the unsuccessful attempt to utilize the unreliable protocol connection.

11. The computer readable medium of claim 10 further comprising instructions for falling back from said unreliable protocol connection to said reliable protocol connection at any time.

12. A source device including a processor, memory and communications circuitry connected together by interconnection circuitry, the processor being operative to execute instructions from the memory to cause the source device to dynamically tunnel over a selected one of an unreliable protocol or a reliable protocol based on network conditions, the dynamic tunneling including:
  establishing a first tunnel to said destination device, said first tunnel being a reliable protocol tunnel using a reliable protocol, the reliable protocol tunnel including a TCP/IP connection in which a TCP transport mechanism runs directly on top of an IP packet delivery mechanism; and
  attempting to utilize a second tunnel between said source device and said destination device using an unreliable protocol, the second tunnel being an unreliable protocol tunnel distinct from the reliable protocol tunnel and including a UDP/IP instance in which a UDP transport mechanism runs directly on top of the IP packet delivery mechanism, and when said attempt to utilize said unreliable protocol tunnel is successful, then using said unreliable protocol tunnel to transmit data between said source device and said destination device, and when said attempt to utilize the unreliable protocol tunnel is unsuccessful, then using said reliable protocol tunnel to transmit data between said source device and said destination device, wherein using said reliable protocol tunnel to transmit data between said source device and said destination device includes using said TCP/IP connection and not said UDP/IP instance for transmitting said data packets upon the occurrence of the unsuccessful attempt to utilize the unreliable protocol tunnel.

13. The source device of claim 12 wherein said reliable protocol tunnel comprises a tunnel using one of SSL over TCP and TLS over TCP.

14. The source device of claim 12 wherein said attempt to utilize an unreliable protocol tunnel to communicate between said source device and said destination device comprises attempting to utilize a tunnel using DTLS over UDP.

15. The source device of claim 12 wherein said source device is capable of falling back from said unreliable protocol tunnel to said reliable protocol tunnel at any time.

16. The source device of claim 14 wherein said tunnel using DTLS over UDP includes using a resumed handshake.

17. The source device of claim 16 wherein said using said resumed handshake includes using a master-secret established by said reliable protocol tunnel.

18. The source device of claim 17 wherein said using said resumed handshake includes using a session-id established by said reliable protocol tunnel.

19. The source device of claim 18 wherein said session-id is used for at least one of the group comprising identifying said master-secret, associating said reliable protocol tunnel with said unreliable protocol tunnel and using said session-id as a security cookie.

20. The source device of claim 12 including, when said attempt to utilize said unreliable protocol tunnel is unsuccessful, identifying a failure to complete a DTLS handshake.

21. The method of claim 1 wherein:
  the unsuccessful attempt to utilize the unreliable protocol connection comprises (1) transmitting an application data payload from the source device on the UDP/IP instance and (2) failing to timely receive an application-level reply message from the destination device which acknowledges receipt of the application data payload by the destination device; and
  switching from the use of the UDP/IP instance to the TCP/IP connection comprises transmitting the same application data payload from the source device on the TCP/IP instance and awaiting timely receipt of the same application-level reply message.

22. The method of claim 21 wherein the application data payload comprises an initial handshake message forming a first message of a multiple-message handshake procedure, and wherein the application-level reply message comprises a responsive second message of the multiple-message handshake procedure.

* * * * *